United States Patent
Take et al.

(10) Patent No.: US 7,221,557 B2
(45) Date of Patent: May 22, 2007

(54) SOLID ELECTROLYTIC CAPACITOR AND METHOD OF MANUFACTURING SOLID ELECTROLYTIC CAPACITOR CATHODE MATERIAL

(75) Inventors: Hiroyoshi Take, Kobe (JP); Mutsumi Yano, Hirakata (JP); Mamoru Kimoto, Hirakata (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 11/384,271

(22) Filed: Mar. 21, 2006

(65) Prior Publication Data
US 2006/0215352 A1  Sep. 28, 2006

(30) Foreign Application Priority Data
Mar. 23, 2005 (JP) ............. 2005-082876

(51) Int. Cl.
*H01G 9/04* (2006.01)
*H01G 9/145* (2006.01)
(52) U.S. Cl. ........................ 361/532; 361/528
(58) Field of Classification Search ......... 361/523, 361/528, 532–533
See application file for complete search history.

(56) References Cited

U.S. PATENT DOCUMENTS

| | | | | |
|---|---|---|---|---|
| 5,754,394 A | * | 5/1998 | Evans et al. | 361/516 |
| 6,483,694 B1 | * | 11/2002 | Monden et al. | 361/523 |
| 2002/0008957 A1 | | 1/2002 | Tadanobu et al. | |

FOREIGN PATENT DOCUMENTS

| | | |
|---|---|---|
| JP | 3-46215 | 2/1991 |
| JP | 10-242000 | 9/1998 |
| JP | 2001-284182 | 10/2001 |
| JP | 2003-59338 | 2/2003 |

* cited by examiner

*Primary Examiner*—Eric W. Thomas
(74) *Attorney, Agent, or Firm*—Westerman, Hattori, Daniels & Adrian, LLP.

(57) ABSTRACT

A solid electrolytic capacitor having an anode of valve metal or of an alloy of which main component is the valve metal; a dielectric layer formed by anodizing the anode; an electrolyte layer formed on the dielectric layer; and a cathode formed on the electrolyte layer; wherein the cathode has a carbon layer containing coated carbon particles in which at least a part of the surface of carbon particles is coated with metal and/or metal compound having higher conductivity than carbon.

4 Claims, 1 Drawing Sheet

Figure 1:
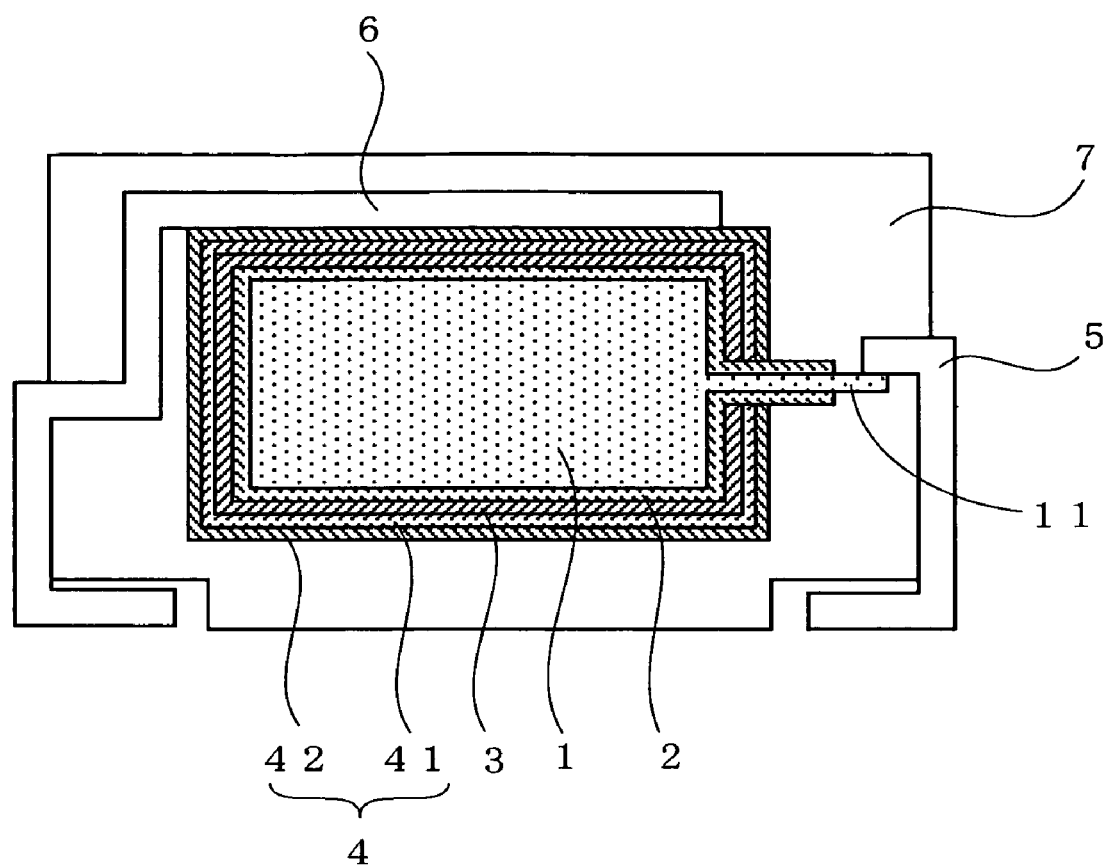

SOLID ELECTROLYTIC CAPACITOR AND METHOD OF MANUFACTURING SOLID ELECTROLYTIC CAPACITOR CATHODE MATERIAL

RELATED APPLICATION

The priority application number Japanese Patent Application 2005-82876 upon which this application is based is hereby incorporated by reference.

BACKGROUND OF THE INVENTION

1. Field of the Invention

The present invention relates to a solid electrolytic capacitor and to a method of manufacturing cathode material of a cathode for said solid electrolytic capacitor, which comprises: an anode of valve metal or of an alloy of which main component is the valve metal; a dielectric layer formed by anodizing said anode; an electrolyte layer formed on said dielectric layer; and a cathode formed on said electrolyte layer. More particularly, a feature of the invention is to improve cathode material used for a cathode of a solid electrolytic capacitor and to lower equivalent series resistance of the solid electrolytic capacitor.

2. Description of the Related Art

Conventionally, solid electrolytic capacitors have been commonly used for a variety of electrolytic equipments. In recent years, because electrolytic equipments, such as a personal computer having higher frequency have required instant supply of electric power to an electric circuit, a development of a solid electrolytic capacitor wherein equivalent series resistance (ESR) is low at high frequency has been demanded.

It has been proposed to fabricate such a solid electrolytic capacitor by: anodizing an anode of valve metal, such as tantalum, aluminum, niobium and titanium, or of an alloy of which main component is such valve metal, in order to form a dielectric layer of such oxide on the anode surface; overlaying an electrolyte layer comprising, for example, a conductive polymer or manganese dioxide on the dielectric layer; and overlaying a carbon layer and a silver layer as a cathode on the electrolyte layer. (See, for example, Japanese Published Unexamined Patent Application No. 3-46215.)

Examples of factors to cause increase of ESR in the solid electrolytic capacitor include dielectric loss, specific resistance of the electrolyte layer and the cathode, contact resistance between the electrolyte layer and the cathode, and so on. Especially, the specific resistance of the electrolyte layer and the cathode, and the contact resistance between the electrolyte layer and the cathode is a major factor to increase in ESR at high frequency. Therefore, a problem in the solid electrolytic capacitor described above has been that when the specific resistance of the electrolyte layer and the cathode and the contact resistance between the electrolyte layer and the cathode become large, ESR becomes high, especially at high frequency.

In recent years, therefore, a solid electrolytic capacitor comprising a carbon layer containing carbon particles and a benzene compound for decreasing specific resistance of an electrolyte layer and a cathode, and contact resistance between the electrolyte layer and the cathode, has been proposed. (See, for example, Japanese Published Unexamined Patent Application No. 2001-284182.)

Nevertheless, in the above-described solid electrolytic capacitor comprising the carbon layer containing the carbon particles and the benzene compound, it is still impossible to fully improve ESR.

SUMMARY OF THE INVENTION

It is an object of the present invention to lower ESR of a solid electrolytic capacitor sufficiently by improving cathode material used for a cathode of the solid electrolytic capacitor.

According to the invention, a solid electrolytic capacitor comprises: an anode of valve metal or of an alloy of which main component is the valve metal; a dielectric layer formed by anodizing said anode; an electrolyte layer formed on said dielectric layer; and a cathode formed on said electrolyte layer; wherein said cathode comprises a carbon layer containing coated carbon particles in which at least a part of the surface of carbon particles is coated with metal and/or metal compound having higher conductivity than carbon.

As the metal coating the surface of the carbon particles and having higher conductivity than carbon, it is preferable to use at least one type of metals selected from silver, gold and platinum. As the metal compound coating the surface of carbon particles and having higher conductivity than carbon, it is preferable to use metal nitride and/or metal carbide comprising at least one type of metals selected from tantalum, niobium, titanium and tungsten.

In manufacturing cathode materials to be used for cathode of the solid electrolytic capacitor, it is possible to coat at least a part of the surface of carbon particles with silver by heat-treating the carbon particles after soaking the carbon particles in a silver nitrate aqueous solution. In addition, it is possible to coat at least a part of the surface of carbon particles with at least one type of metals selected from silver, gold and platinum by electroless plating. Further, it is possible to coat at least a part of the surface of carbon particles with metal nitride by heat-treating the carbon particles under nitrogen atmosphere after soaking the carbon particles in a solution of metal ammine complexes. Still further, it is possible to coat at least a part of the surface of carbon particles with metal carbide by heat-treating the carbon particles after soaking the carbon particles in a solution of metal complexes.

In the solid electrolytic capacitor according to the present invention, because the carbon layer of the cathode contains the coated carbon particles in which at least a part of the surface of carbon particles is coated with metal and/or metal compound having higher conductivity than carbon, specific resistance of the carbon layer is decreased and contact resistance of the interface contacting with the carbon layer is also decreased. Further, although an uneven distribution of the carbon particles and the metal having high conductivity or the metal compound having high conductivity occurs because of the specific gravity difference between them in the case that the carbon particles and the metal having high conductivity or the metal compound having high conductivity are mixed, it did not occur in the solid electrolytic capacitor of the present invention. Therefore, in the solid electrolytic capacitor of the present invention, an uniform carbon layer having decreased specific resistance is formed, and contact resistance of the interface contacting with the carbon layer is decreased.

As a consequence, according to the present invention, a solid electrolytic capacitor wherein ESR is low can be obtained.

Further, if at least one type of metals selected from silver, gold and platinum is used as the metal having higher conductivity than carbon to coat the surface of carbon particles, or metal nitride and/or metal carbide comprising at least one type of metals selected from tantalum, niobium, titanium and tungsten is used as the metal compound having higher conductivity than carbon to coat the surface of carbon particles, because of their high conductivity, the specific resistance of the carbon layer and the contact resistance of the interface contacting with the carbon layer are further decreased, so that ESR in the solid electrolytic capacitor is further lowered.

In manufacturing the cathode materials to be used for the cathode of the solid electrolytic capacitor, if the following method is used, it becomes possible to surely produce the coated carbon particles in which at least a part of the surface of carbon particles is coated with metal and/or metal compound having higher conductivity than carbon. The method is as follows: a method of coating at least a part of the surface of carbon particles with silver by heat-treating the carbon particles after soaking the carbon particles in a silver nitrate aqueous solution, a method of coating at least a part of the surface of carbon particles with at least one type of metals selected from silver, gold and platinum by electroless plating, a method of coating at least a part of the surface of carbon particles with metal nitride by heat-treating the carbon particles under nitrogen atmosphere after soaking the carbon particles in a solution of metal ammine complexes, or a method of coating at least a part of the surface of carbon particles with metal carbide by heat-treating the carbon particles after soaking the carbon particles in a solution of metal complexes.

These and other objects, advantages and features of the invention will become apparent from the following description thereof taken in conjunction with the accompanying drawing which illustrates specific embodiments of the invention.

BRIEF DESCRIPTION OF THE DRAWING(S)

FIG. 1 is a sectional view showing a solid electrolytic capacitor according to an embodiment of the present invention.

DESCRIPTION OF THE PREFERRED EMBODIMENTS

Hereinbelow, a solid electrolytic capacitor according to an embodiment of the invention is specifically described with reference to the accompanying drawing. It is to be noted that the solid electrolytic capacitor of the invention should not be limited to the following example thereof and suitable changes and modifications may be made thereto within the scope of the invention.

In a solid electrolytic capacitor of the embodiment of the invention, as shown in FIG. 1, an anode 1 of valve metal, such as, tantalum, aluminum, niobium or titanium, or of an alloy of which main component is such valve metal is used and a lead 11 is led out of the anode 1.

Then, a dielectric layer 2 is formed on the surface of the anode 1 by anodizing the anode 1 in an aqueous electrolyte and an electrolyte layer 3 is formed to cover the surface of the dielectric layer 2. Examples of materials used for the electrolyte layer 3 include conducting polymer materials, such as polypyrrole, polythiophene or polyaniline, or manganese dioxide.

In the solid electrolytic capacitor of the embodiment, a cathode 4 to cover the surface of the electrolyte layer 3 is formed as follows. A carbon layer 41 is formed on the electrolyte layer 3 and a silver layer 42 is formed on the carbon layer 41.

After that, an anode lead 5 is connected to the lead 11 led out of the anode 1, a cathode lead 6 is connected to the silver layer 42 of the cathode 4, and the solid electrolytic capacitor is encapsulated with a resin layer 7 of an insulating resin, such as epoxy resin, to thrust the anode lead 5 and the cathode lead 6 outside.

In the solid electrolytic capacitor of the embodiment, the carbon layer 41 formed contains coated carbon particles in which at least a part of the surface of carbon particles is coated with metal and/or metal compound having higher conductivity than carbon.

When the carbon layer 41 contains the coated carbon particles in which at least a part of the surface of carbon particles is coated with the metal and/or the metal compound having higher conductivity than carbon, specific resistance of the carbon layer 41 is decreased and contact resistance of the interface of the electrolyte layer 3 or of the silver layer 42 contacting with the carbon layer 41 is also decreased, so that ESR in the solid electrolytic capacitor is lowered.

As the metal having higher conductivity than carbon to coat the surface of carbon particles, it is preferable to use at least one type of metals selected from silver, gold and platinum. As the metal compound having higher conductivity than carbon to coat the surface of carbon particles, it is preferable to use metal nitride and/or metal carbide comprising at least one type of metals selected from tantalum, niobium, titanium and tungsten.

The coated carbon particles are produced by the following methods: A method of coating at least a part of the surface of carbon particles with silver by heat-treating the carbon particles after soaking the carbon particles in a silver nitrate aqueous solution, a method of coating at least a part of the surface of carbon particles with at least one type of metals selected from silver, gold and platinum by electroless plating, a method of coating at least a part of the surface of carbon particles with metal nitride by heat-treating the carbon particles under nitrogen atmosphere after soaking the carbon particles in a solution of metal ammine complexes, or a method of coating at least a part of the surface of carbon particles with metal carbide by heat-treating the carbon particles after soaking the carbon particles in a solution of metal complexes.

When coating at least a part of the surface of carbon particles with silver by heat-treating the carbon particles after soaking the carbon particles in the silver nitrate aqueous solution, if a heat-treatment temperature is low, silver is not sufficiently reduced and silver oxide is left in a coating layer, so that it becomes difficult to sufficiently decrease the specific resistance of the carbon layer 41. Therefore, it is preferable to set the heat-treatment temperature to not less than 160° C.

When coating at least a part of the surface of carbon particles with metal nitride by heat-treating the carbon particles under nitrogen atmosphere after soaking the carbon particles in the solution of metal ammine complexes, if a heat-treatment temperature is low, it becomes difficult to form suitable metal nitride. On the other hand, if the heat-treatment temperature is high, a crack occurs because of expansion of metal nitride. In both cases, it becomes difficult to sufficiently decrease the specific resistance of the carbon layer 41, therefore, it is preferable to set the heat-treatment temperature in the range from 200° C. to 600° C.

When coating at least a part of the surface of carbon particles with metal carbide by heat-treating the carbon particles after soaking the carbon particles in the solution of metal complexes, for example, metal complexes of which ligand is at least one type selected from porphyrin, phthalocyanine or etylenediaminetetraacetic acid (EDTA) may be used as the metal complexes as mentioned above.

Hereinbelow, solid electrolytic capacitors and methods of manufacturing solid electrolytic capacitor cathode materials according to examples of the invention are specifically described, and it will be demonstrated by the comparison with comparative examples that ESR is low in the inventive solid electrolytic capacitors of Examples. It is to be noted that the solid electrolytic capacitors and methods of manufacturing the solid electrolytic capacitor anode materials of the invention should not be limited to the following examples thereof and suitable changes and modifications may be made thereto within the scope of the invention.

EXAMPLE 1

In a solid electrolytic capacitor of Example 1, a porous sintered body of tantalum formed by sintering tantalum particles was used for an anode 1 and a lead 11 was led out of the anode 1.

The anode 1 was anodized by applying a voltage of about 10 V for about 10 hours in 0.5 wt % phosphoric acid solution having a temperature of about 60° C. to form a dielectric layer 2 of tantalum oxide on the surface of the anode 1, and an electrolyte layer 3 of polypyrrole was formed on the dielectric layer 2 by electrolytic polymerization, and so on.

Then, a cathode 4 depositing a carbon layer 41 and a silver layer 42 on the electrolyte layer 3 was formed.

The carbon layer 41 was formed on the electrolyte layer 3 as follows. After soaking carbon particles in a silver nitrate aqueous solution, the carbon particles were heat-treated at 160° C. for 30 minutes. This operation was repeated 3 times to obtain coated carbon particles in which the surface of carbon particles was coated with silver. Then, the coated carbon particles, water, and carboxy methyl cellulose as a binding agent, were mixed to prepare carbon paste. Next, the carbon paste was applied on the electrolyte layer 3 and dried at 150° C. for 30 minutes to form the carbon layer 41.

Then, silver paste was applied on the carbon layer 41 and dried to form the silver layer 42.

Then, a solid electrolytic capacitor according to Example 1 was fabricated as follows. An anode lead 5 was connected to the lead 11 led out of the anode 1, a cathode lead 6 was connected to the silver layer 42 of the cathode 4, and the solid electrolytic capacitor was encapsulated with a resin layer 7 of epoxy resin, to thrust the anode lead 5 and the cathode lead 6 outside.

EXAMPLE 2

The same procedure as in Example 1 was used to fabricate a solid electrolytic capacitor of Example 2, except that a tantalum alloy of which main component is tantalum containing 0.5 wt % of aluminum was used as material for an anode 1.

EXAMPLE 3

In Example 3, coated carbon particles prepared as follows were used for forming the carbon layer 41. In order to prepare the coated carbon particles in which the surface of carbon particles was coated with tantalum nitride, the carbon particles were heat-treated under nitrogen atmosphere at 300° C. for 30 minutes after being soaked in a solution of tantalum complexes of which ligand was ammonium. A solid electrolytic capacitor of Example 3 was fabricated in the same manner as in Example 1 except for the coated carbon particles.

EXAMPLE 4

In Example 4, coated carbon particles prepared as follows were used for forming the carbon layer 41. In order to prepare the coated carbon particles in which the surface of carbon particles was coated with tantalum carbide, the carbon particles were heat-treated at 150° C. for 30 minutes after being soaked in a solution of tantalum complexes of which ligand was porphyrin. A solid electrolytic capacitor of Example 4 was fabricated in the same manner as in Example 1 except for the coated carbon particles.

COMPARATIVE EXAMPLE 1

The same procedure as in Example 1 was used to fabricate a solid electrolytic capacitor of Comparative Example 1, except that carbon paste containing about 5 wt % of carbon particles and about 5 wt % of pyrogallol of a benzene compound, and being adjusted to pH 10 by ammonia was used for forming a carbon layer.

COMPARATIVE EXAMPLE 2

The same procedure as in Example 1 was used to fabricate a solid electrolytic capacitor of Comparative Example 2, except that carbon particles of which surface was not coated was used for forming a carbon layer.

COMPARATIVE EXAMPLE 3

The same procedure as in Example 1 was used to fabricate a solid electrolytic capacitor of Comparative Example 3, except that a silver layer was formed on an electrolyte layer without providing a carbon layer.

Then, ESR at about 100 kHz of each of the resultant solid electrolytic capacitors of Examples 1 to 4 and Comparative Examples 1 to 3 was measured by means of LCR meter. Each value of ESR in the solid electrolytic capacitors was calculated based on ESR of the solid electrolytic capacitor of Example 1 defined as 100. The results were shown in Table 1 below.

TABLE 1

| | COATING MATERIAL OF COATED CARBON PARTICLES | ESR |
| --- | --- | --- |
| EXAMPLE 1 | silver | 100 |
| EXAMPLE 2 | silver | 99 |
| EXAMPLE 3 | tantalum nitride | 110 |
| EXAMPLE 4 | tantalum carbide | 110 |
| COMPARATIVE EXAMPLE 1 | — | 160 |
| COMPARATIVE EXAMPLE 2 | — | 180 |
| COMPARATIVE EXAMPLE 3 | — | 10000 |

As a consequence, in each of the solid electrolytic capacitors of Examples 1 to 4 using the coated carbon particles in which the surface of carbon particles was coated with silver, tantalum nitride, or tantalum carbide for the carbon layer of the cathode, ESR was remarkably lowered as compared with the solid electrolytic capacitor of Comparative Example 3 in which the carbon layer was not provided. In addition, in each of the solid electrolytic capacitors of Examples 1 to 4, ESR was greatly lowered as compared with the solid electrolytic capacitor of Comparative Example 1 in which the carbon layer contains pyrogallol of the benzene compound in addition to the carbon particles, and the solid electrolytic capacitor of Comparative Example 2 wherein the carbon particles of which surface was not coated was used for forming the carbon layer.

EXAMPLES 5a to 5c

The same procedure as in Example 1 was used to fabricate each solid electrolytic capacitor of Examples 5a to 5c, except that the type of the coated carbon particles used for forming the carbon layer 41 was changed.

In Example 5a, coated carbon particles prepared by coating the surface of carbon particles with silver by electroless plating after soaking the carbon particles in a plating solution dissolving silver pottassium cyanide and dimethylamine borane as a reducing agent, were used. In Example 5b, coated carbon particles prepared by coating the surface of carbon particles with gold by electroless plating after soaking the carbon particles in a plating solution dissolving gold potassium cyanide and dimethylamine borane as a reducing agent, were used. In Example 5c, coated carbon particles prepared by coating the surface of carbon particles with platinum by electroless plating after soaking the carbon particles in a plating solution dissolving platinic acid hexachloride and dimethylamine borane as a reducing agent, were used.

Then, the same as above, ESR at about 100 kHz of each of the resultant solid electrolytic capacitors of Examples 5a to 5c was measured by means of LCR meter. Each value of ESR in the solid electrolytic capacitors was calculated based on ESR of the solid electrolytic capacitor of Example 1 defined as 100. The results were shown in Table 2 below.

TABLE 2

| | COATING MATERIAL OF COATED CARBON PARTICLES | ESR |
| --- | --- | --- |
| EXAMPLE 5a | silver | 101 |
| EXAMPLE 5b | gold | 101 |
| EXAMPLE 5c | platinum | 102 |
| EXAMPLE 1 | silver | 100 |

As a consequence, the same as in the solid electrolytic capacitor of Example 1, in the solid electrolytic capacitors of Examples 5a to 5c using the coated carbon particles in which the surface of the carbon particles was coated with silver, gold or platinum by electroless plating for the carbon layer of the cathode, ESR was greatly lowered as compared with the solid electrolytic capacitors of Comparative Examples.

EXAMPLES 1.1 TO 1.6

The same procedure as in Example 1 was used to fabricate each solid electrolytic capacitor of Examples 1.1 to 1.6, except that a heat-treatment temperature of heat-treating the carbon particles after being soaked in the silver nitrate aqueous solution was changed in producing the coated carbon particles in which the surface of carbon particles was coated with silver for forming the carbon layer 41.

Each heat-treatment temperature was set as follows: 140° C. in Example 1.1, 150° C. in Example 1.2, 155° C. in Example 1.3, 165° C. in Example 1.4, 170° C. in Example 1.5, and 180° C. in Example 1.6.

Then, the same as above, ESR at about 100 kHz of each of the resultant solid electrolytic capacitors of Examples 1.1 to 1.6 was measured by means of LCR meter. Each value of ESR in the solid electrolytic capacitors was calculated based on ESR of the solid electrolytic capacitor of Example 1 defined as 100. The results were shown in Table 3 below.

TABLE 3

| | COATING MATERIAL OF COATED CARBON PARTICLES | HEAT-TREATMENT TEMPERATURE (° C.) | ESR |
| --- | --- | --- | --- |
| EXAMPLE 1.1 | silver | 140 | 132 |
| EXAMPLE 1.2 | silver | 150 | 125 |
| EXAMPLE 1.3 | silver | 155 | 120 |
| EXAMPLE 1 | silver | 160 | 100 |
| EXAMPLE 1.4 | silver | 165 | 102 |
| EXAMPLE 1.5 | silver | 170 | 104 |
| EXAMPLE 1.6 | silver | 180 | 101 |

As a consequence, ESR was greatly lowered in the solid electrolytic capacitors of Examples 1 and 1.4 to 1.6 wherein the heat-treatment temperature of heat-treating the carbon particles after being soaked in the silver nitrate aqueous solution was set to not less than 160° C. in producing the coated carbon particles in which the surface of carbon particles was coated with silver. Therefore, the heat-treatment temperature was preferably set to not less than 160° C.

EXAMPLES 6a TO 6c

In order to produce coated carbon particles to be used for forming the carbon layer 41, instead of the solution of tantalum complexes of which ligand was ammonium used in Example 3, a solution of niobium complexes of which ligand was ammonium was used in Example 6a, a solution of titanium complexes of which ligand was ammonium was used in Example 6b, and a solution of tungsten complexes of which ligand was ammonium was used in Example 6c. Except for the above, the same procedure as in Example 3 was used in Example 6a to produce coated carbon particles in which the surface of carbon particles was coated with niobium nitride, the same procedure as in Example 3 was used in Example 6b to produce coated carbon particles in which the surface of carbon particles was coated with titanium nitride, and the same procedure as in Example 3 was used in Example 6c to produce coated carbon particles in which the surface of carbon particles was coated with tungsten nitride.

Then, each of the solid electrolytic capacitors of Examples 6a to 6c using each of the resultant carbon particles produced as described above was fabricated in the same manner as in Example 3.

Then, the same as above, ESR at about 100 kHz of each of the resultant solid electrolytic capacitors of Examples 6a to 6c was measured by means of LCR meter. Each value of ESR in the solid electrolytic capacitors was calculated based on ESR of the solid electrolytic capacitor of Example 3 defined as 100. The results were shown in Table 4 below.

TABLE 4

| | COATING MATERIAL OF COATED CARBON PARTICLES | ESR |
|---|---|---|
| EXAMPLE 6a | niobium nitride | 105 |
| EXAMPLE 6b | titanium nitride | 102 |
| EXAMPLE 6c | tungsten nitride | 101 |
| EXAMPLE 3 | tantalum nitride | 100 |

As a consequence, the same result as the solid electrolytic capacitor of Example 3 wherein the coated carbon particles in which the surface of carbon particles was coated with tantalum nitride was used could be obtained in each of the solid electrolytic capacitors of Examples 6a to 6c wherein the coated carbon particles in which the surface of the carbon particles was coated with niobium nitride, titanium nitride or tungsten nitride was used in the carbon layer of the cathode.

EXAMPLES 3.1 TO 3.8

The same procedure as in Example 3 was used to fabricate each solid electrolytic capacitor of Examples 3.1 to 3.8, except that a heat-treatment temperature of heat-treating the carbon particles under nitrogen atmosphere after being soaked in the solution of tantalum complexes of which ligand was ammonium was changed in producing the coated carbon particles in which the surface of carbon particles was coated with tantalum nitride.

Each heat-treatment temperature was set as follows: 150° C. in Example 3.1, 200° C. in Example 3.2, 250° C. in Example 3.3, 400° C. in Example 3.4, 500° C. in Example 3.5, 600° C. in Example 3.6, 650° C. in Example 3.7, and 700° C. in Example 3.8.

Then, the same as above, ESR at about 100 kHz of each of the resultant solid electrolytic capacitors of Examples 3.1 to 3.8 was measured by means of LCR meter. Each value of ESR in the solid electrolytic capacitors was calculated based on ESR of the solid electrolytic capacitor of Example 3 defined as 100. The results were shown in Table 5 below.

TABLE 5

| | COATING MATERIAL OF COATED CARBON PARTICLES | HEAT-TREATMENT TEMPERATURE (° C.) | ESR |
|---|---|---|---|
| EXAMPLE 3.1 | tantalum nitride | 150 | 130 |
| EXAMPLE 3.2 | tantalum nitride | 200 | 116 |
| EXAMPLE 3.3 | tantalum nitride | 250 | 108 |
| EXAMPLE 3 | tantalum nitride | 300 | 100 |
| EXAMPLE 3.4 | tantalum nitride | 400 | 101 |
| EXAMPLE 3.5 | tantalum nitride | 500 | 112 |
| EXAMPLE 3.6 | tantalum nitride | 600 | 115 |
| EXAMPLE 3.7 | tantalum nitride | 650 | 125 |
| EXAMPLE 3.8 | tantalum nitride | 700 | 132 |

As a consequence, in the solid electrolytic capacitors wherein the heat-treatment temperature of heat-treating the carbon particles after being soaked in the solution of tantalum complexes of which ligand was ammonium was in the range from 150° C. to 700° C. in producing the coated carbon particles in which the surface of carbon particles was coated with tantalum nitride, ESR was lowered. Especially, in the solid electrolytic capacitors of Examples 3 and 3.2 to 3.6 wherein the heat-treatment temperature was in the range from 200° C. to 600° C., ESR was further lowered. Among all, the solid electrolytic capacitor of Example 3 wherein the heat-treatment temperature was 300° C. showed the lowest ESR.

EXAMPLES 4.1 AND 4.2

In order to produce coated carbon particles in which the surface of carbon particles was covered with tantalum carbide, instead of the solution of tantalum complexes of which ligand was porphyrin used in Example 4, a solution of tantalum complexes of which ligand was phthalocyanine was used in Example 4.1, and a solution of titanium complexes of which ligand was etylenediaminetetraacetic acid (EDTA) was used in Example 4.2. Except for the above, the same procedure as in Example 4 was used to fabricate each solid electrolytic capacitors of Examples 4.1 and 4.2.

Then, the same as above, ESR at about 100 kHz of each of the resultant solid electrolytic capacitors of Examples 4.1 and 4.2 was measured by means of LCR meter. Each value of ESR in the solid electrolytic capacitors was calculated based on ESR of the solid electrolytic capacitor of Example 4 defined as 100. The results were shown in Table 6 below.

TABLE 6

| | COATING MATERIAL OF COATED CARBON PARTICLES | LIGAND OF METAL COMPLEXES | ESR |
|---|---|---|---|
| EXAMPLE 4.1 | tantalum carbide | phthalocyanine | 101 |
| EXAMPLE 4.2 | tantalum carbide | EDTA | 105 |
| EXAMPLE 4 | tantalum carbide | porphyrin | 100 |

As a consequence, in producing the coated carbon particles in which the surface of carbon particles was coated with tantalum carbide, even in the case that the ligand of tantalum complexes to be used for soaking the carbon particle was not ammonium but phthalocyanine or EDTA, it was possible to obtain the same result as the solid electrolytic capacitor of Example 4.

Although tantalum was used for the anode of each of Examples described above, even when the other valve metal, such as aluminum, niobium or titanium or an alloy of which major component is these valve metal is used, the same results can be obtained.

Although the present invention has been fully described by way of examples, it is to be noted that various changes and modifications will be apparent to those skilled in the art. Therefore, unless otherwise such changes and modifications depart from the scope of the invention, they should be construed as being included therein.

The invention claimed is:

1. A solid electrolytic capacitor comprising: an anode of valve metal or of an alloy of which main component is said valve metal; a dielectric layer formed by anodizing said anode; an electrolyte layer formed on said dielectric layer; and a cathode formed on said electrolyte layer;
   wherein said cathode comprises a carbon layer containing coated carbon particles in which at least a part of the surface of carbon particles is coated with metal and/or metal compound having higher conductivity than carbon.

2. The solid electrolytic capacitor according to claim 1, wherein said metal coating the surface of carbon particles and having higher conductivity than carbon is at least one type of metals selected from silver, gold and platinum.

3. The solid electrolytic capacitor according to claim 1, wherein said metal compound coating the surface of the carbon particles and having higher conductivity than carbon is metal nitride and/or metal carbide.

4. The solid electrolytic capacitor according to claim 3, wherein metal in said metal nitride and said metal carbide is at least one type of metals selected from tantalum, niobium, titanium and tungsten.

* * * * *